United States Patent
Santraine et al.

(10) Patent No.: US 7,216,267 B2
(45) Date of Patent: May 8, 2007

(54) SYSTEMS AND METHODS FOR MULTISTAGE SIGNAL DETECTION IN MIMO TRANSMISSIONS AND ITERATIVE DETECTION OF PRECODED OFDM

(75) Inventors: Arnaud Santraine, Eatontown, NJ (US); Patrick Duvaut, Tinton Falls, NJ (US)

(73) Assignee: Conexant Systems Inc., Red Bank, NJ (US)

( * ) Notice: Subject to any disclaimer, the term of this patent is extended or adjusted under 35 U.S.C. 154(b) by 0 days.

(21) Appl. No.: 11/224,328

(22) Filed: Sep. 13, 2005

(65) Prior Publication Data

US 2006/0059410 A1  Mar. 16, 2006

Related U.S. Application Data

(60) Provisional application No. 60/654,077, filed on Feb. 18, 2005, provisional application No. 60/609,002, filed on Sep. 13, 2004.

(51) Int. Cl.
*H04L 1/20* (2006.01)
(52) U.S. Cl. ............... 714/709; 375/340; 375/341; 714/810
(58) Field of Classification Search .......... 714/709, 714/780, 810; 370/340, 343; 375/343, 340, 375/341
See application file for complete search history.

(56) References Cited

U.S. PATENT DOCUMENTS

| | | | | |
|---|---|---|---|---|
| 5,457,704 A | * | 10/1995 | Hoeher et al. | 714/794 |
| 6,470,474 B1 | * | 10/2002 | Fredrickson et al. | 714/794 |
| 6,580,930 B1 | * | 6/2003 | Fulghum et al. | 455/574 |
| 6,751,771 B2 | * | 6/2004 | Chuang et al. | 714/784 |
| 6,757,337 B2 | * | 6/2004 | Zhuang et al. | 375/267 |
| 6,981,201 B2 | * | 12/2005 | Reggiani et al. | 714/786 |
| 6,986,098 B2 | * | 1/2006 | Poeppelman et al. | 714/807 |
| 7,089,483 B2 | * | 8/2006 | McEwen et al. | 714/795 |
| 7,155,660 B1 | * | 12/2006 | Burd | 714/795 |

* cited by examiner

*Primary Examiner*—Stephen M. Baker
(74) *Attorney, Agent, or Firm*—Thomas, Kayden, Horstemeyer & Risley

(57) ABSTRACT

Systems and methods for multi-stage signal detection in MIMO transmission including Bernoulli-Gaussian detection are provided. A multistage iterative signal decoder is provided that exploits the property that in a relatively simply decoding scheme such as mean square error (MSE) or zero-forcing (ZF) only a small portion of the total symbols are mis-detected. Therefore, an optimality test is performed on the output of a relatively low complexity decoder unit. If the symbol passes the optimality test, it is presumed to be correctly decoded. Otherwise, the symbol is sent for further processing to a relatively higher complexity decoding unit such as a sphere decoder. In this way, processing efficiency is increased, because only those symbols requiring additional processing are processed by the high complexity processing unit.

19 Claims, 11 Drawing Sheets

Performance with MSE detection, B-G detection (1 iteration), and without precoding for 50 QPSKs Performance comparison for 1,2 and 5 iterations

SYSTEMS AND METHODS FOR MULTISTAGE SIGNAL DETECTION IN MIMO TRANSMISSIONS AND ITERATIVE DETECTION OF PRECODED OFDM

FIELD OF THE INVENTION

The various embodiments of the present invention relate generally to signal detection in symbol-based transmissions system and more particularly to systems and methods for multi-stage signal detection and iterative detection based on an low-complexity optimality test that determines which symbols have been decoded correctly and which need additional processing.

BACKGROUND OF THE INVENTION

The complexity reduction of well-performing Multiple Input Multiple Output (MIMO) detection schemes has drawn considerable interest recently. Even though sophisticated integrated circuits may be available today for the most complex schemes, including Maximum Likelihood (ML, using sphere decoding), the actual throughput and integration costs of these detectors is out of the scope of projected applications of MIMO systems. Low complexity heuristic methods using techniques derived from equalization provide a simple alternative to algorithmic schemes. However, their poor performance makes them unsuited for most practical applications. Typically, the proportion of wrongly decoded symbols (even in the case of zero-forcing 'ZF' or means square error 'MSE') represent only a fraction of the transmitted data. Thus, gains in accuracy are derived at the expense of significant losses in performance and increased system complexity.

Multi-carrier transmission over a frequency selective channel implies large differences between the Signal to Noise Ratios (SNR) on the transmitted tones. For independently detected tones, the best performance in terms of average bit error rate (BER) is obtained when conditions are equally good on all sub-carriers, as proved by Jensen's inequality. In the case of precoded Orthogonal Frequency Division Multiplexing (OFDM), independent per dimension minimum square error (MSE) and joint-maximum-likelihood (ML) detections are not equivalent, as tones are no longer independent. Jensen's bound, which is reached by MSE detection, can then be outperformed. However, the computational complexity of joint-ML detection makes it unrealistic in practical systems.

SUMMARY OF THE INVENTION

Thus, there is a need for a symbol detection scheme that ameliorates some or all of the above-noted deficiencies. Various embodiment of the invention accomplish this through a dual or multistage detection scheme where a heuristic detector (or more generally a low-complexity scheme) processes the received symbols, and only a fraction of the data are reprocessed by an algorithmic detection scheme (or more generally, a high-complexity and/or high performance scheme). To implement this detection scheme, we derive a low-complexity optimality test that determines or identifies, after initial detection, which symbols need further processing. The complexity gain of such a system may be measured by the ratio of data that need reprocessing, while its quality is driven by performance loss (if any) compared to what is obtained when running the algorithmic scheme exclusively. The complexity of such a test may preferably be kept to a minimum, so as not to cancel the gain from fewer computational runs. As noted above, typically, the proportion of wrongly decoded symbols represent only a fraction of the transmitted data. Therefore, using a more complex scheme only on these few mis-detected symbols would reduce the global complexity massively. Various embodiments may subject the results of the iterative detection to an optimality test. If the syndrome is less than zero, the detection results may be considered good enough and output. Otherwise, in various embodiments, if the syndrome is greater than zero, the received symbol may be reprocessed based on a more efficient detection scheme, such as, for example, one based on sphere decoding. In various embodiments, the results of the second detection may be subject to another optimality test.

Various embodiments utilize iterative detection of precoded OFDM based on optimality evaluation over the complex field that allows approximation of the joint-ML detection using iterative detection, outperforming Jensen's MSE bound typically by several dB, without a need for feedback to the transmitter as a first low-complexity detection scheme. Various embodiments subject the results of the iterative detection to an optimality test. If the syndrome is less than zero, the iterative detection results may be considered good enough and output. Otherwise, in various embodiments, the received symbol is modified accordingly to the syndrome.

Thus, at least one embodiment of the invention may provide a multistage system for signal detection comprising a first relatively low complexity decoding unit configured to decode received symbols, a optimality test unit configured to test the output of the first decoding unit, and a second relatively high complexity decoding unit configured to reprocess those received symbols that fail a condition of the optimality test unit.

At least one additional embodiment of the invention may provide a method of decoding incoming signals comprising decoding a received signal containing at least one symbol with a first decoder, performing an optimality test on the output of the first decoder, and for those symbols passing the optimality test, outputting the symbols, otherwise, sending the symbols to a second decoder Another embodiment of the invention may provide A multistage symbol decoding transceiver comprising a first decoder unit performing a first decoding scheme, an optimality testing unit configured to test the output of the first decoder unit to determine if (1) a current symbol has been correctly decoded, or (2) if the current symbol requires additional processing to be correctly decoded, and a second decoder unit performing a second decoding scheme on those symbols determined to require additional processing.

These and other embodiments and advantages of the present invention will become apparent from the following detailed description, taken in conjunction with the accompanying drawings, illustrating by way of example the principles of the invention.

DETAILED DESCRIPTION OF THE DISCLOSURE

Figure 1:
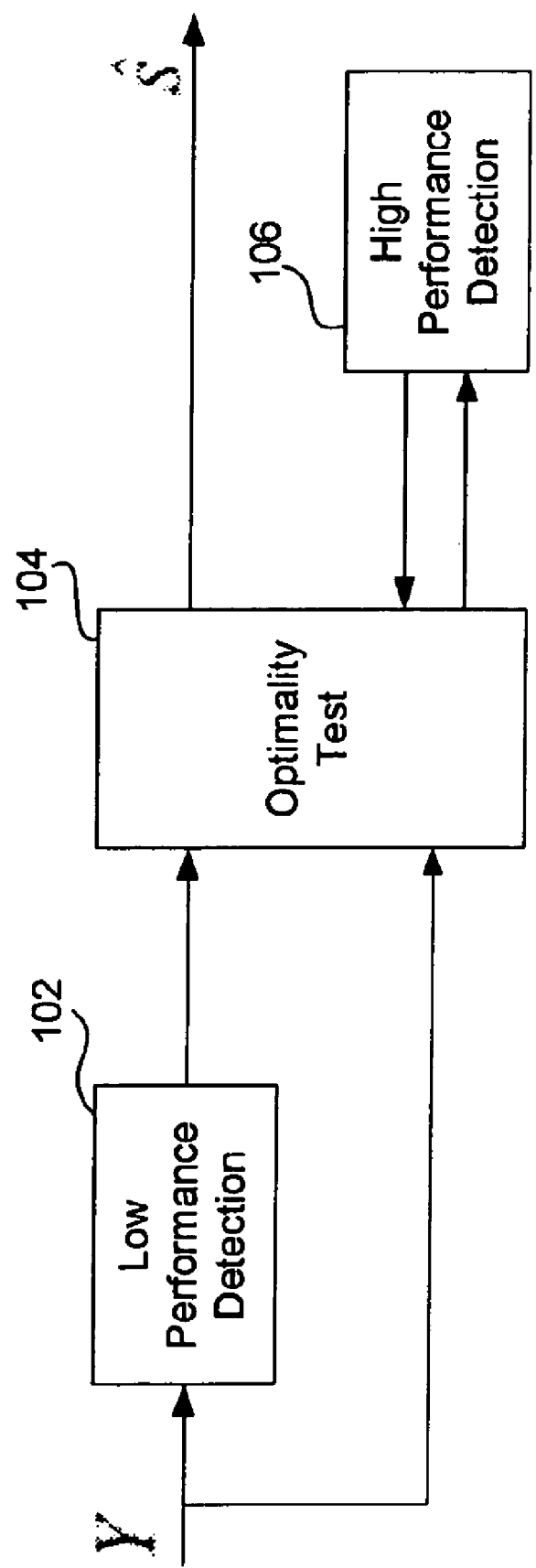
FIG. 1 is a block diagram illustrating a multistage signal detection system in accordance with at least one embodiment of the invention.
Figure 2:
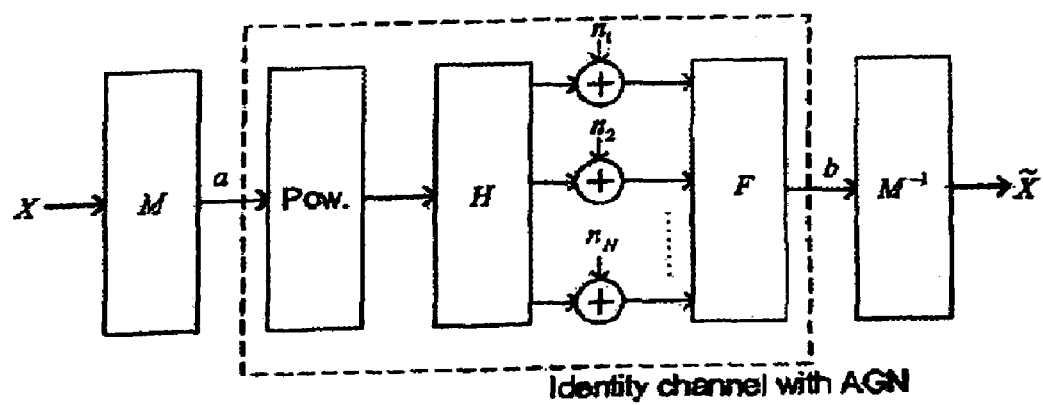
FIG. 2 is an equivalent block diagram of a symbol-space baseband model of precoded OFDM according to at least one embodiment of the invention.

The following description is intended to convey a thorough understanding of the embodiments described by providing a number of specific embodiments and details involving systems and methods for multistage signal detection in multiple input multiple output (MIMO) transmission systems. However, it should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

Consider the general form of a MIMO system with a complex-valued lattice generating matrix $H_c$ of size $N_r \times N_t$, wherein $N_r$ represents the number of receiver sensors (e.g., antennae, copper lines, etc.) and $N_t$ represents the number of transmit points (e.g., antennae, copper lines, etc.). For a given transmitted symbol vector $S_c$ with components drawn from a two dimensional constellation, the N×1 received vector may be $Y_c = H_c S_c + W_c$, where $W_c$ is the complex-valued noise with covariance matrix $R_c$. This complex-valued system may be represented as a real-valued system such as Y=HS+W, with:

$$Y = [\text{Re}(Y_c)^T \text{Im}(Y_c)^T]^T, \quad (1)$$

$$S = [\text{Re}(S_c)^T \text{Im}(S_c)^T]^T, \quad (2)$$

$$H = \begin{bmatrix} \text{Re}(H_c) & -\text{Im}(H_c) \\ \text{Im}(H_c) & \text{Re}(H_c) \end{bmatrix}, \quad (3)$$

$$W = [\text{Re}(W_c)^T \text{Im}(W_c)^T]^T \quad (4)$$

This real-valued representation may include the physical channel, the desired space time code, and possibly an additional precoder, without loss of generality. For a detailed discussion of construct H refer to "Space-Time Block Coding for Wireless Communications," E. Larsson, Cambridge Press, 2003.

The detection problem faced by the receiver is to find the estimate $\hat{S}$ of the transmitted vector minimizing the log-likelihood metric, that is $$\hat{S} = \underset{S}{\text{argmin}} (Y - HS)^T R^{-1} (Y - HS) \quad (5)$$

where R is the real-valued covariance matrix of W. When the noise is white, the metric to minimize reduces to $\|Y-HS\|^2$, and the sphere decoding algorithm provides a maximum likelihood estimate at a substantial cost in terms of complexity. Other commonly used methods that do not perform as well as ML include Nulling and Canceling (N&C), and many other known algorithms along with low performance Minimum Square Error (MSE) or even Zero Forcing (ZF) detections.

Note the log-likelihood metric obtained from a received vector Y and a constellation vector S:

$$L_Y(S) = (Y-HS)^T R^{-1} (Y-HS) \quad (6)$$

By definition, the necessary and sufficient condition for a detected vector $S_0$ to be the ML decision for a received vector Y is that no other constellation vector produces a smaller likelihood metric (6): $L_Y(S) \geq L_Y(S_0) \forall S$. Equivalently, $S_0$ is the ML decision if there does not exist any non-zero variation $\Delta$ from $S_0$ that reduces (6) to: $L_Y(S_0+\Delta) > L_Y(S_0) \forall \Delta \neq 0$. A necessary condition can be deduced from the previous inequality when considering only a subset of all the possible variations $\Delta$. An optimality test may be constructed based on this necessary condition when considering only the first and second-order variations on $\Delta$. The assumption supporting this restriction is that when a low quality detector does not output the ML symbol, there is usually at least one better symbol that differs from it only by one or two elements. For illustration purposes, and not by way of limitation, the following description is presented in the context of Quadrature Amplitude Modulation (QAM).

Consider the tentative symbol $S_0$, and a first-order variation $\Delta_n = [0 \ldots \delta \ldots 0]^T$ where the subscript n indicates that $\delta$, the only non-zero element of $\Delta_n$, is located at the nth line. If the assumption is made that H is pseudo-invertible with pseudo-inverse $\check{H}^{-1}$, the log-likelihood metric of $S_0+\Delta_n$ can be shown as $$L_Y(S_0+\Delta_n) = L_Y(S_0) + \Delta_n^T R_H \Delta_n + 2(S_0 - \check{H}^{-1} Y)^T R_H \Delta_n \quad (7)$$

where $R_H = H^T R^{-1} H$. When the noise is white, this matrix is proportional to the Gramm matrix $H^T H$. If we further note $\tilde{S} = \check{H}^{-1} Y$ the zero forcing estimate obtained from Y, we obtain:

$$L(S_0+\Delta_n) = L(S_0) + \Delta_n^T R_H \Delta_n + 2(S_0 - \tilde{S})^T R_H \Delta_n \quad (8)$$

where the subscript Y is dropped for simplicity. The variation $\Delta_n$ is then of interest if the sum of the last two terms of (8) is negative. Using the fact that only one element of $\Delta_n$ is non zero, and rewriting $A = (S_0 - \tilde{S})^T$, the perturbation reduces the metric when $$R_{H(n;n)} + \frac{2}{\delta}A(n) < 0.$$

The range of possibilities for δ depends on the size of the constellation. When QAM constellations are used, where the spacing between adjacent symbols in each dimension is normalized to d, this test may be replaced by the sufficient condition $$|A(n)| > \frac{d}{2}R_{H(n;n)},$$

where the size of the constellation does not appear anymore. We define as a "syndrome" the vector $$Q = |A| - \Gamma \otimes \frac{d}{2}\text{diag}(R_H) \quad (9)$$

Vector $\Gamma$, with $0<\Gamma(n)\leq 1$ is discussed in greater detail below. The symbol ⊗ denotes the element-wise product. $\Gamma$ may be considered as a margin coefficient in the test. Getting an all-negative syndrome does not guarantee that $S_0$ is the ML estimate, but not getting an all-negative syndrome (when $\Gamma(n)=1\forall$ n) guarantees that $S_0$ is not the ML estimate, and hence this symbol will be reprocessed by a second, more effective, detection scheme.

Assuming that $\tilde{S}$ is already available, most of the complexity of this test comes from computing A, which may be obtained from a matrix-vector multiplication. The number of operations required to perform this computation may be comparable to what is needed when an equalizing system is used to obtain $\tilde{S}$. Hence, compared to basic ZF or MSE detection, the computational cost may be doubled. The overhead computation involved in the initialization of the algorithm is that of extracting the diagonal of $R_H$. Considering only the first order variation, with $\Gamma(n)=1\forall$n somewhat improves the performance of the system but does not guarantee a close to full-ML performance. Being able to recover only this simple type of errors may not be sufficient to extract all the diversity from the received signal. It may be desirable to seek higher-dimensional tests that will improve the performance, but not increase the complexity.

Thus, in various embodiments, by adaptively choosing vector $\Gamma$, the syndrome test (9) may be used to also detect any possible second-order improvement. We define the second order perturbation $\Delta_{np}=[0 \ldots \Delta_n \ldots 0 \ldots \delta_p \ldots 0]^T$ where n and p are the indexes of the two non-zero components. Reusing the notations introduced in section 3.1, we obtain:

$$L(S_0 + \Delta_{np}) = \quad (10)$$
$$L(S_0) + \delta_n^2 R_{H(n;n)} + \delta_p^2 R_{H(p;p)} + 2\delta_n A(n) + 2\delta_p A(p) + 2\delta_n\delta_p R_{H(n;p)}$$

There is no possible second-order improvement if $\forall$n; $\forall$p≠n, and $\forall\delta_n$; $\delta_p$ in the considered constellation $$\delta_n^2 R_{H(n,n)} + \delta_p^2 R_{H(p,p)} + 2\delta_n A(n) + 2\delta_p A(p) + 2\delta_n\delta_p R_{H(n,p)} > 0 \quad (11)$$

Suppose that for simplicity we want to check (11) using only the test (9), with some ad-hoc value of vector $\Gamma$. For given values of $\Gamma(n)$ and $\Gamma(p)$, the test can detect $$\Gamma(n)\delta_n^2 R_{H(n,n)} + 2\delta_n A(n) > 0$$

$$\Gamma(p)\delta_p^2 R_{H(p,p)} + 2\delta_p A(p) > 0 \quad (12)$$

Without loss of generality, we define $\Gamma_m = \max\{\Gamma(n), \Gamma(p)\}$. Using some of the properties of $R_H$, it may be shown that (12) implies that $$\delta_n^2 R_{H(n,n)} + \delta_p^2 R_{H(p,p)} + 2\delta_n A(n) + 2\delta_p A(p) > (1-\Gamma_m)$$
$$(\delta_n^2 R_{H(n,n)} + \delta_p^2 R_{H(p,p)}) \quad (13)$$

Hence the sufficient condition on $\Gamma_m$ for (9) to detect both first and second-order improving variations, obtained by comparing (11) and (13):

$$(1-\Gamma_m)(\delta_n^2 R_{H(n,n)} + \delta_p^2 R_{H(p,p)}) > -2\delta_n\delta_p R_{H(n,p)} \quad (14)$$

This condition must be satisfied for all n; p≠n, and for all possible $\delta_n$ and $\delta_p$. Expand $\delta_n$=ad and $\delta_p$=bd. Again, d is the spacing between the constellation points in one dimension, and a and b are drawn from a continuous subset of the integer field, with a maximum range depending on the size of the constellation. For example, if 64-QAM are used, $|a|\leq 8$, and so is $|b|$. The normalized spacing d can be simplified, and the sufficient condition on $\Gamma_m$ becomes $$\Gamma_m \leq 1 + \frac{2ab\,R_{H\,(n,p)}}{a^2 R_{H\,(n,n)} + b^2 R_{H\,(p,p)}} \quad (15)$$

with the assumption that the diagonal elements of $R_H$ are non-zero (which is certain for any actual system). From the definition of $\Gamma_m$, this condition may apply, without further modification, to $\Gamma_n$ and $\Gamma_p$. Although it is not straightforward to find the largest possible value of $\Gamma(m)$ ensuring that (15) is verified for all a and b in a discrete set, we can determine $\Gamma_m$ by bounding (15) with a and b in the real field, which is a stronger constrain. Considering the right-hand term of the equation, its extremums are obtained when nulling the derivatives, which leads to only one extremum condition (the extremum is not unique):

$$\frac{b}{a} = \sqrt{\frac{R_{H\,(n,n)}}{R_{H\,(p,p)}}} \quad (16)$$

This condition leads to the maximums of the considered function. The limit on a and b that was discussed before does not appear anymore. Plugging the ratio in (15), we obtain the sufficient condition on $\Gamma(n)$ for the detection of all the possible first and second-order improvements using (9):

$$\Gamma(n) \leq 1 - \frac{|R_{H\,(n,p)}|}{\sqrt{R_{H\,(n,n)}R_{H\,(p,p)}}} \quad (17)$$

Because $\Gamma(n)$ must be selected as large as possible, to ensure that as few vectors as possible fail the test, to reduce the computational load. Searching for Γ(n) for all n requires only one run through the matrix $R_H$:

$$\zeta = \max_{p \neq n} \frac{|R_{H(n,p)}|}{\sqrt{R_{H(p,p)}}} \quad (18)$$

$$\Gamma(n) = 1 - \frac{\zeta}{R_{H(n,n)}}$$

In data mode, this test is no more complex than the one-dimensional test. However, its initialization may take more computation as the computation of the margin coefficients from vector Γ comes at an extra cost. This extra step does not jeopardize the global complexity. A sample distribution of the margin coefficients is presented in the discussion of FIG. 5.

In the definition of vector $A=(S_0-\tilde{S})^T R_H$, the zero-forcing equalized vector $\tilde{S}$ was used. However, in various embodiments, it may be replaced, for example, by the MSE equalized vector almost without loss. The motivation for this substitution is that typically, the equalized vector will be used to obtain $S_0$ by slicing. Hence, knowing that MSE offers somewhat better performance than ZF, this replacement may improve the global performance of the system. Also, the first scheme and the reprocessing scheme can be matched for efficiency. For example, using nulling and canceling as the re-processing scheme may lead to MSE as a first scheme, as MSE equalization is actually the first step of the N&C algorithm. Conversely, sphere decoding uses a ZF equalized vector. So a ZF equalizer may be a better choice as the first scheme. However, there is no restriction to the use of an algorithmic scheme even as first scheme. As is discussed in greater detail below in the context of FIGS. 2–6, various embodiments may utilize a first scheme based on a low complexity Bernoulli-Gaussian detection that offers even better performance than MSE or ZF detection.

Discussion will now proceed in the context of an exemplary systems and methods for performing the above described multi-stage detection scheme. Based on the above-developed optimality test, a multistage detection scheme may be applied to an MIMO system.

FIG. 1 is a block diagram illustrating the basic concept of the detection scheme in accordance with an embodiment of the present invention. As shown in the Figure, a symbol Y received in a MIMO system may be first subject to a relatively low performance detection 102. The low performance detection 102 may involve a detection scheme with a relatively low complexity but an acceptable performance. After going through the low performance detection 102, the processed symbol may be subject to an optimality test 104 or quality check as formulated in section 3 above. If it is determined the processed symbol does not pass the optimality test, the received symbol may be reprocessed with a high performance detection 106. Finally the detected vector $\hat{S}$ may be output. The output $\hat{S}$ may result from either the low performance detection 102 or the high performance detection 106.

As discussed briefly above, in lieu of either MSE or ZF detection, various embodiments may use other low complexity schemes to perform first stage decoding with the optimality test being performed on the result of the considered scheme.

Recent work on multicarrier systems has produced several tools that improve the average BER/SNR performance when sub-channel conditions present large differences between tones, due to selective fading and/or colored noise. The average BER performance of the system is, considering the BER=$f$(SNR) function for the considered constellation, represented by equation (19) as follows:

$$BER = \frac{1}{N}\sum_{n=1}^{N} BER_n = \frac{1}{N}\sum_{n=1}^{N} f(SNR_n) \quad (19)$$

When the tones' SNRs are in the region ∩ convexity of function $f$, Jensen's inequality proves that in the case of independently demodulated tones the BER can be represented by equation (20) as follows:

$$BER \geq f\left(\frac{1}{N}\sum_{n=1}^{N} SNR_n\right) \quad (20)$$

with equality when all SNRs are equal. The exact boundary of the ∩ convexity region depends on the constellation and can be found analytically or numerically. Adaptive power distribution, and the use of 'minimum BER' precoders, have been shown to significantly improve performance. Both schemes allow one to obtain equal conditions (SNR) on each subchannel, hence reaching the lower bound on BER when tones are detected independently. Power allocation requires feedback to the transmitter, which is not always practical or even feasible. Power allocation also dramatically modifies the spectrum of the transmitted signal which, may produce issues such as, for example, in terms of power regulation. In contrast, blind precoders do not require feedback and can be conditioned to keep the spectrum unmodified but their joint-ML detection is prohibitively expensive, thus, restricting the solution to sub-optimal MSE detection. Various embodiment of the invention provide a low complexity pseudo-joint-ML algorithm based on the Bernoulli-Gaussian deconvolution approach that does not require any feedback channel and that outperforms MSE detection. In various embodiments, MSE detection is outperformed by more than two dB such as, for example, in the case of heavy multipaths channels.

OFDM systems (as well as discrete multi-tone (DMT)) can be viewed at the receiver as N parallel unitary sub-channels, each with its own channel characteristics, such as, noise, SNR, etc. The system may be modeled by the block diagram shown in FIG. 2. The equivalent channel between points a and b is considered as unitary with additive noise. Each sub-channel $n_1, n_2 \ldots, n_N$ transmits a subsequence of data with a specific BER that is a function of the constellation that is used and the noise conditions over the sub-channel.

Jensen's inequality guarantees that performance is optimal for independently demodulated tones when all the tones present the same SNR, or, equivalently, the same noise power. However, this result is only true if all sub-channels show SNRs that are in the region of ∩ convexity of the BER v. SNR function for the constellation. The linear precoder M (square complex-valued matrix of size N) and the preceding outputs X' obtained from a data vector X (at point α on FIG. #) are defined by equation (21) as follows:

$$X'=MX \quad (21)$$

It is assumed that the precoding matrix M is invertible in order to be able to recover the data. The vector of received signals Y is then defined at point bin FIG. # as in equation (22) as follows:

$$Y = X' + W \quad (22)$$

with W being the vector of noise samples. Hence:

$$E[WW^\dagger] = R = diag\{\sigma_1^2, \ldots \sigma_n^2\} \quad (23)$$

The precoding is inverted at the reception and the received data vector is obtained:

$$\tilde{X} = M^{-1}Y = X + M^{-1}W \quad (24)$$

Precoders that guarantee that the received noise correlation matrix has a constant diagonal include normalized Hadamard matrices (when they exit) along with discrete Fourier transform (DFT) and inverse DFT (IDFT) matrices (which, are defined for all N). Because precoders are well known in the art, a detailed discussion has been intentionally omitted. For an exemplary discussion refer to "Minimum BER block precoders for zero-forcing equalization," Y Ding, IEEE Transactions on Signal Processing, 2003, hereby incorporated by reference. However, it must be appreciated that in all cases, the precoder is fixed, does not depend upon the channel conditions and is known at the receiver. It can also be easily confirmed that these three types of precoders do not modify the spectrum of the transmitted signal. It should also be noted that these three types of matrices are unitary, and hence that $M^{-1} = M^\dagger$. For ease of explanation, the DFT matrix has been used as the default precoder.

The noise covariance matrix at the reception is obtained from equation (24) as follows:

$$R_M = E[(M^{-1}W)(M^{-1}W)^\dagger] = M^\dagger RM \quad (25)$$

As is evident from expression (25), $R_M$ is not diagonal. Hence, the MSE decision, dimension by dimension, on the received symbols is not optimal, even though it reaches Jensen's bound. Its defect is that it doesn't take advantage of the diversity introduced by the precoder. The maximum likelihood decision $\hat{X}$ is the one among the constellation symbol vectors that minimize expression (26):

$$(\tilde{X} - \hat{X})^\dagger R_M^{-1} (\tilde{X} - \hat{X}) \quad (26)$$

This is obtained by straightforward derivation of the log likelihood function assuming complex circular noise. We can point out here that $R_M$ and $R_M^{-1}$ can be fully built from the measured SNRs on each tone (it should be appreciated that these can be obtained at no overhead costs while computing the FEQ coefficients) and the knowledge of M. Thus, equation (27) provides:

$$R_M^{-1} = M^\dagger R^{-1} M \quad (27)$$

There is no need to measure cross correlations which, is a very expensive operation in terms of time and computational resources. A brute force solution is not realistic, as the number of possibilities is $P^N$ where P is the number of symbols in the constellation. Restricting the discussion to the case of quadrature amplitude modulation (QAM), if in each dimension of the received vector $\tilde{X}$ we limit tests to the 4 symbols surrounding the soft received point $\tilde{X}(n)$, the number of tests drops down to $4^N$. However, this is still challenging and not feasible in practical systems.

Considering the case of one-dimensional perturbation, equation (26) develops into the likelihood metric for a detected vector $\hat{X}_0$ $$L_m(\hat{X}_0) = \tilde{X}^\dagger R_M^{-1} \tilde{X} - 2Re[\hat{X}_0^\dagger R_M^{-1} \tilde{X}] + \hat{X}_0^\dagger R_M^{-1} \hat{X}_0 \quad (28)$$

Where Re stands for "real part." To test a one-dimensional perturbation on $\hat{X}_0$ note that:

$$\Delta_n = \begin{bmatrix} 0 \\ \vdots \\ x \\ \vdots \\ 0 \end{bmatrix} \quad (29)$$

Where the subscript n means that $x = x_{Re} + jx_{im}$ is the $n^{th}$ component of $\Delta_n$. Then, by replacing $\hat{X}_0$ by $\hat{X}_1 = \hat{X}_0 + \Delta_n$ let $$L_m(\hat{X}_1) = L_m(\hat{X}_0) + 2Re[(\hat{X}_0 - \tilde{X})^\dagger R_M^{-1} \Delta_n] + \Delta_n^\dagger R_M^{-1} \Delta_n \quad (30)$$

The perturbation $\Delta_n$ hence reduces the likelihood metric if $$2Re[(\hat{X}_0 - \tilde{X})^\dagger R_M^{-1} \Delta_n] + \Delta_n^\dagger R_M^{-1} \Delta_n < 0 \quad (31)$$

Knowing that the perturbation $\Delta_n$ only has one non-zero component, we obtain $$b = \Delta_n^\dagger R_M^{-1} \Delta_n = |x|^2 R_{n;n}^{-1} = |x|^2 \alpha \quad (32)$$

where $$\sigma = \frac{1}{N} \sum_{n=1}^{N} \frac{1}{\sigma_n^2} \quad (33)$$

In the case of a regularly spaced constellation, such as standard normalized QAM, $x_{re}$ and $x_{im} \in \{0; \pm 2\}$. FIG. # provides an example of this.

$$A = \left[ (\hat{X}_0 - \tilde{X})^\dagger R_M^{-1} \right]^T = A_{re} + jA_{im} \quad (34)$$

other term of expression (31) is:

$$2Re[(\hat{X}_0 - \tilde{X})^\dagger R_M^{-1} \Delta_n] = 2Re[xA(n)] = 2(x_{re}A_{re}(n) - x_{im}A_{im}(n)) \quad (35)$$

The modification $\Delta_n$ is then of interest only if $$2(x_{re}A_{re}(n) - x_{im}A_{im}(n)) + (x_{re}^2 + x_{im}^2)\alpha < 0 \quad (36)$$

Notice that the modification of the real part only ($x = \pm 2$) and imagine part only ($x = \pm 2j$) can be led independently while producing the same result as extensive testing of all cases, when the target is not only to get a negative metric but the most negative one. Thus expression (18) splits into the following two expressions:

$$\begin{cases} 2x_{re}A_{re}(n) + x_{re}^2\alpha < 0 \\ -2x_{im}A_{im}(n) + x_{im}^2\alpha < 0 \end{cases} \quad (37)$$

Moreover, if the search is limited to the nearest four points in each dimension (that is, for n=1 ... N) as previously mentioned, to stay in the neighboring QPSK, it is only necessary to test one real perturbation (x=2 or x=−2) and one imaginary perturbation per dimension. This can be compared to a block decoding using a CHASE algorithm such as disclosed in "Limited-trial CHASE decoding," G. Arico, IEEE Transactions on Information Theory, 49(11): 2972–2975, 2003, hereby incorporated by reference in its entirety. It is evident from expressions (18) and (19) that the improvement can be tested independently on each dimension, thus removing the need for joint processing.

Figure 3:
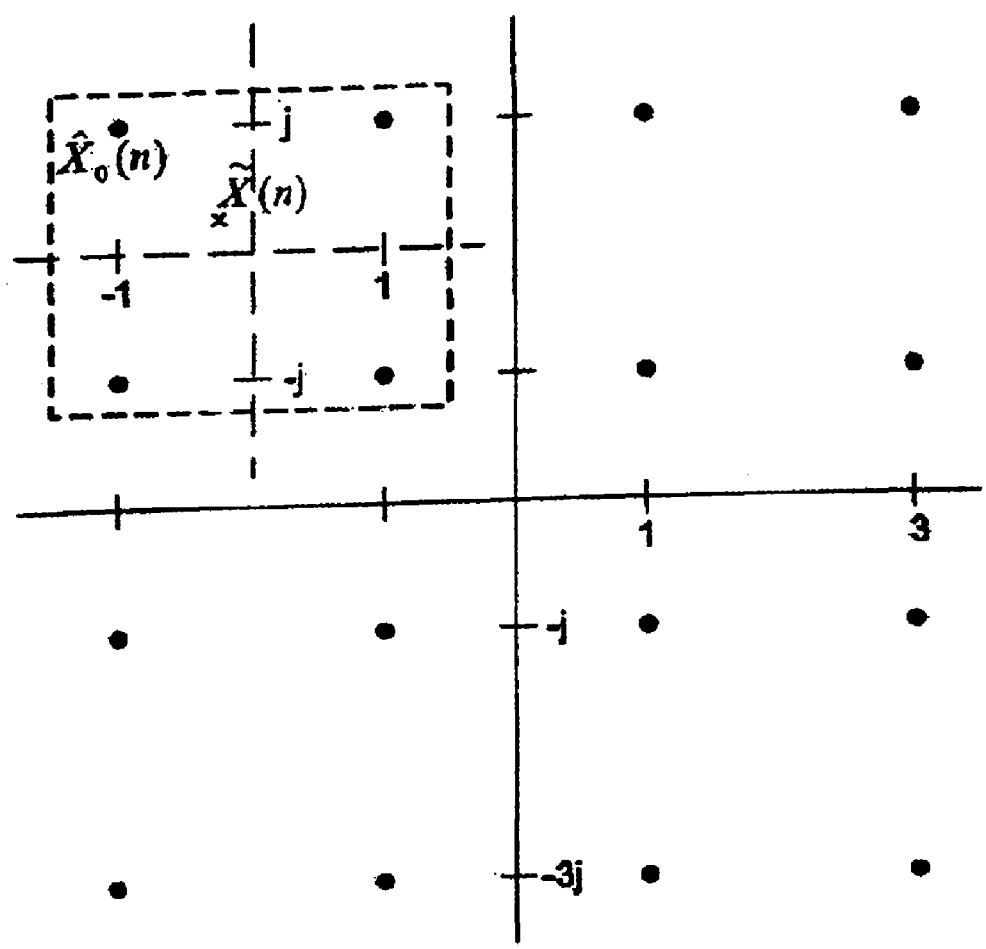
FIG. 3 is a constellation diagram illustrating a tested QPSK in the case of a 16-QAM constellation according to at least one embodiment of the invention.

As discussed herein, various embodiments of the invention provide systems and methods for pseudo-maximum likelihood detection of complex valued signals based on simplified B-G algorithms. For the purposes of example, Gray mapping and ±1 bit labeling has been assumed. Referring now to FIG. 3, using Gray coding (typically done because it limits the BER) allows the consideration of any 4-point neighborhood surrounding $\tilde{X}$ is strictly equivalent to a quadrature phase shift key (QPSK). Labeling bits with ±1 instead of a {0; 1} will allow simplification of test expressions. FIG. # provides an example of tested QPSK in the case of 16-QAM.

In the exemplary detection algorithm discussed herein, the initial detected vector is set to $\hat{X}_0 = MSE[\tilde{X}]$. That is, in each dimension, the closest symbol must be determined. This basic symbol detection scheme reaches Jensen's bound. If the constellations used are large than QPSK, only the QPSK surrounding $\tilde{X}$ are considered, such as, as shown in FIG. #. It should be noted that $b_{re}(n)$ and $b_{im}(n)$ respectively are the bit coded on the real and imaginary parts of the neighboring QPSK, n∈{1, ..., N}. FIG. # illustrates this procedure, in the case of a 16-QAM.

The conditions on the permutation of $b_{re}(n)$ and $b_{im}(n)$ are, once A is computed, obtained directly from expression (37) by inspection of the possible cases. If $b_d(n)=1$ (with d=re or d=im), the only reasonable perturbation of the d-part of this dimension is $x_d=-2$. conversely, if $b_d(n)=-1$, $x_d=2$ is the only perturbation that allows us to stay in the considered QPSK:

$$\begin{cases} b_{re}(n) = -b_{re}(n) & \text{if } A_{re}(n)b_{re}(n) > \alpha \\ b_{im}(n) - b_{im}(n) & \text{if } -A_{im}(n)b_{im}(n) > \alpha \end{cases} \quad (38)$$

where the index n differentiates the N dimensions of the detected vector. This expression is based on the assumption that constellation points are spaced as in FIG. 3 and that using a different constellation may result in minor modification of this test. This is a simple threshold test. After updating all dimensions, the new estimate $\hat{X}_1$ is obtained. In this procedure, A is never updated, as there is no cross-dimensional detection. Expression (38) shows that the detection rule is much simpler than the initial negative log-likelihood minimization function of expression (26). FIG. 3 shows one dimension (indexed in n) of such a system using 16-QAMs. The considered QPSK is the one in the second quadrant (denoted by the dashed box). In this example, the received signal $\tilde{X}(n)$ will create an MSE estimate $\hat{X}_0(n)=-3+3j$ in the 16-QAM, which corresponds to $b_{re}(n)=-1$ and $b_{im}(n)=1$ in the tested QPSK. In the case of a 16-QAM, only 2 of the 4 coded bits are considered for modification.

Figure 5:
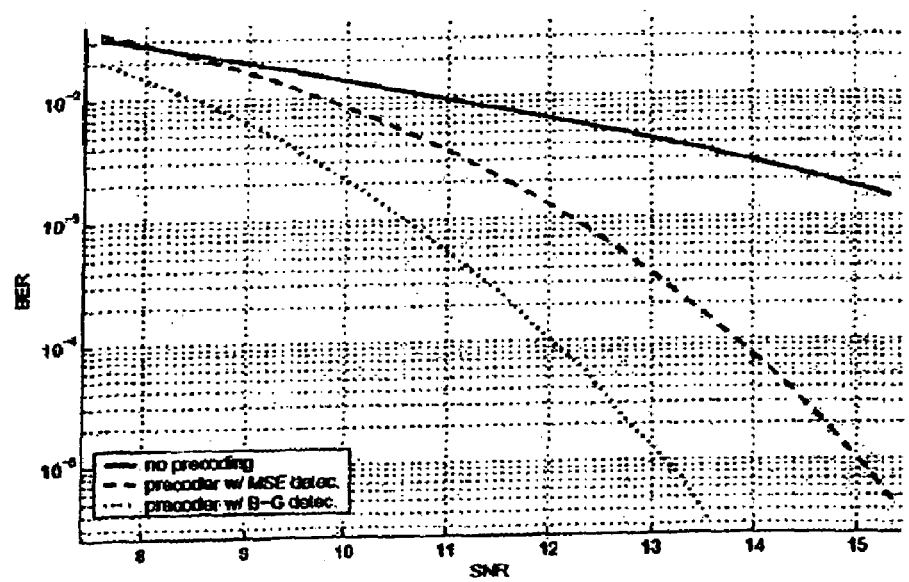
FIG. 5 is a BER v. SNR plot illustrating the results of no precoding, precoding with MSE detection and precoding with B-G detection according to at least one embodiment of the invention.
Figure 6:
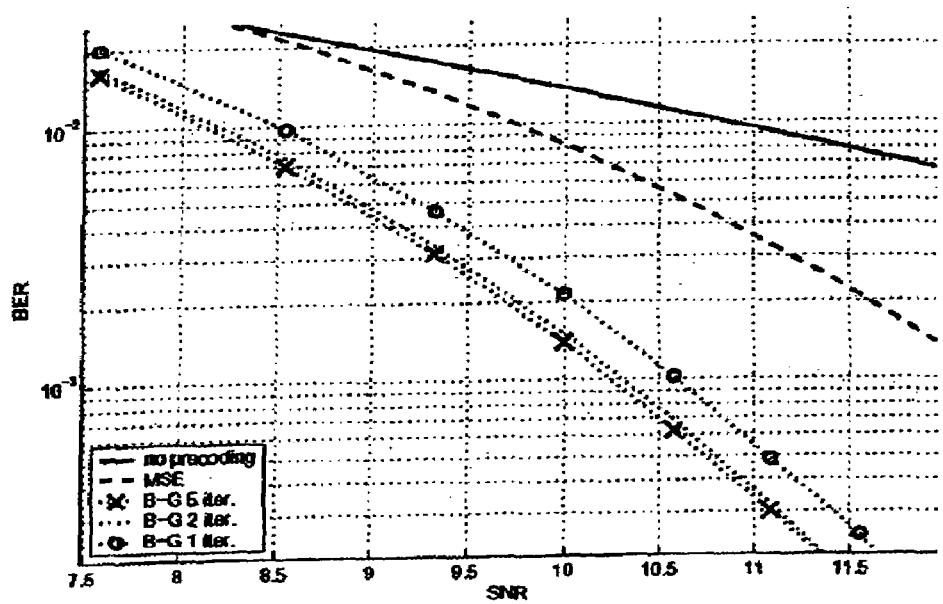
FIG. 6 is a close up of FIG. 5 including the performance obtained with 2 and 5 iterations of the B-G algorithm according to at least one embodiment of the invention.

In various embodiments, the algorithm discussed above can be run iteratively after updating A using the following expression:

$$A_{i+1} = \left(\hat{X}_i + \sum_{n=1, n \in D} \Delta n - \tilde{X}\right)^\dagger R_M^{-1} \quad (39)$$

where D is the set of the perturbations that reduces the likelihood costs function. However, the additional gain is typically low compared to the benefit of the first iteration, as the algorithm converges quickly. FIG. 5 illustrates the BER v. SNR performance with no precoding and with precoding using MSE detection and B-G detection (1 iteration) for 50 QPSKs. FIG. 6 is a close up of FIG. 5 also showing the performance obtained with 2 and 5 iterations of the B-G algorithm.

Figure 4:
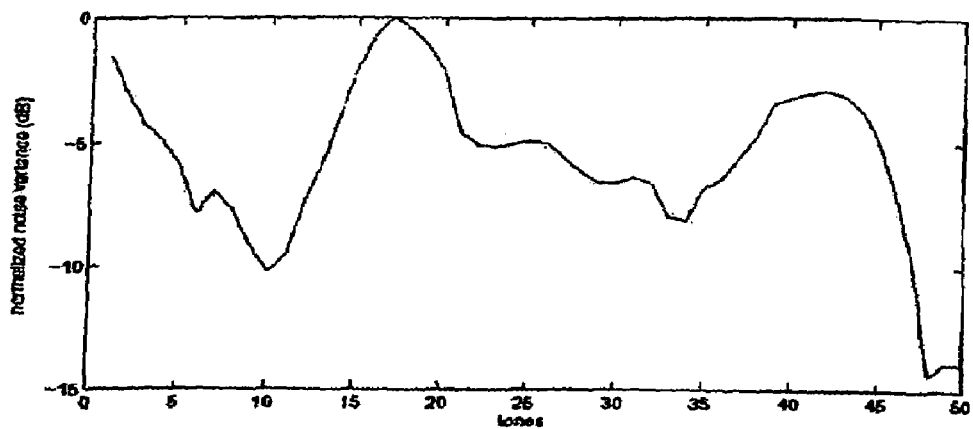
FIG. 4 is a normalized residual noise variance dB curve for a 50 tone QPSK according to at least one embodiment of the invention.

As one example, the method was tested over one of the wireless channels prototyped by the IEEE group for Ultra Wide Band (UWB) systems (802.15.3a) as discussed in IEEE 802.15 Working Group for WPANs, Channel subcommittee final report 2003, hereby incorporated by reference in its entirety. FIG. 4 shows the residual noise variance on each tone without precoding, normalized by the largest variance. FIGS. 5 and 6 show the performance obtained without precoder, and with precoder and MSE (Jensen's bound) or the proposed iterative detection detections. In this plot, the SNR is defined as SNR=$\sigma_s^2\alpha$. In this example, 50 QPSKs are combined (N=50). As predicted by Jensen's inequality, precoding improves the performance substantially. Additionally, iterative detection increases performance by about 2 dB for a BER of $10^{-5}$ in only one iteration. It should be appreciated that this scenario stands in the average for this scheme. Often the performance improvement of iterative detection over MSE is even greater. An additional feature that was observed is that iterative detection improves performances outside the ∩ convexity region of the BER v. SNR function.

Figure 7:
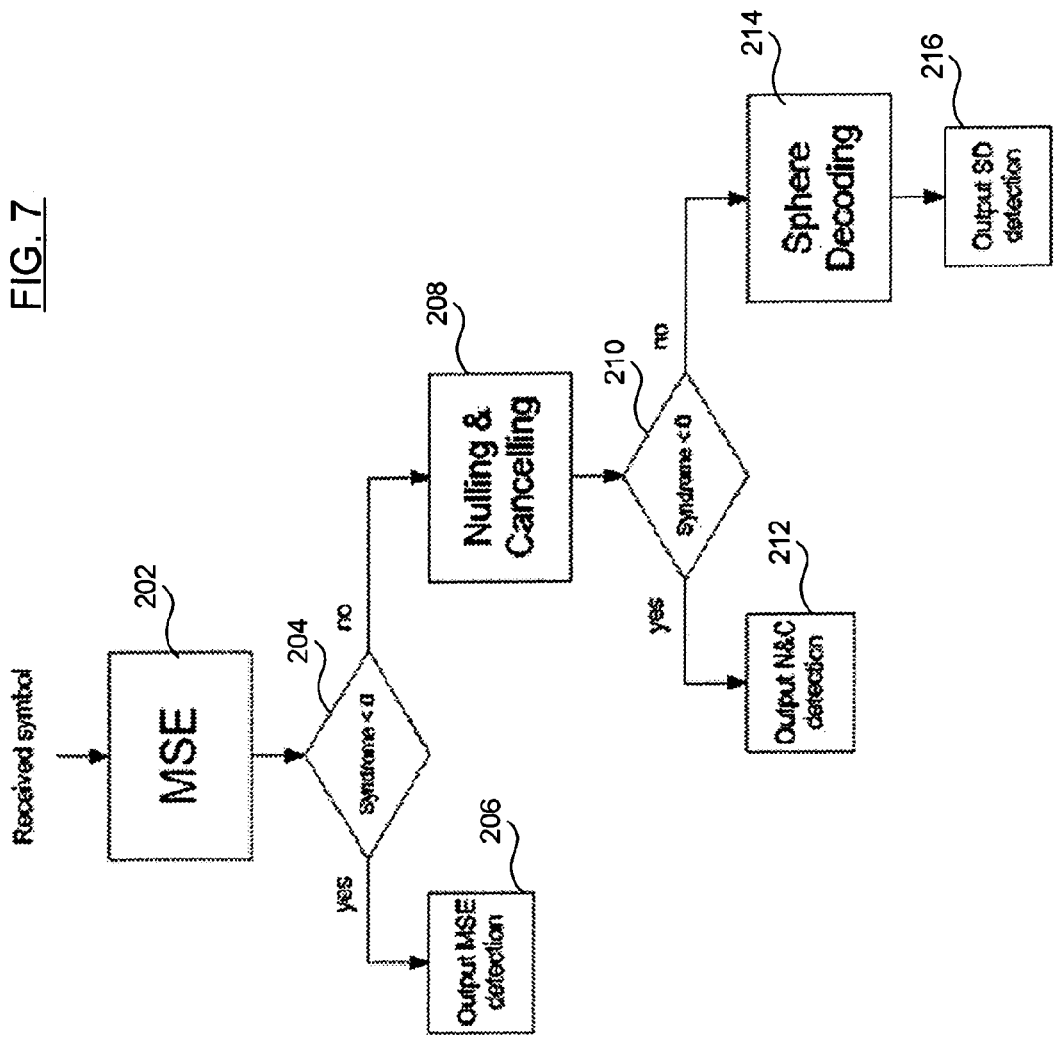
FIG. 7 is a flow chart highlighting the steps of a method for decoding symbols in a multistage decoder according to at least one embodiment of the invention.

Referring now to FIG. 7, an exemplary 3-stage detection scheme in accordance with at least one embodiment of the invention is illustrated. In step 202, the symbol received in an MIMO system may be processed based on an MSE detection scheme. In step 204, the MSE detection results may be subject to an optimality test. If the syndrome is less than zero, the MSE detection results are considered good enough and may be output in step 206. In various embodiments, if the syndrome is greater than zero, the received symbol may be reprocessed based on a nulling and canceling (N&C) detection scheme in step 208. Then, in step 210, the N&C detection results may be subject to another optimality test. If the syndrome is less than zero, the MSE detection results may be output in step 212. Otherwise, another reprocessing based on sphere coding may be performed in step 214 and its detection results may be output in step 216. It should be noted that, in reality, only a small portion of the received signals will fail the optimality test in step 204, and even fewer will fail the optimality test in step 210. Thus, most signals may only undergo low-complexity computation.

We present the results obtained by simulation using the proposed scheme, when the initial detector is an MSE equalizer/slicer, and the reprocessing scheme in a sphere decoder. We used a 4-transmit, 3-receive antennas, 64-QAM system with white noise and a precoded space time code of time-spread two with four symbols per block, as detailed in (19).

$$\begin{bmatrix} u_1^* + u_2^* + u_3^* + u_4^* & -2u_1^* + u_3^* \\ -u_1 + u_2 + 2u_3 - u_4^* & -u_1 - u_2 - u_3 - u_4 \\ -2u_1 + u_3 & u_1 + 3u_3 \\ 2u_2 - 3u_3 & u_1^* - u_2^* - 2u_3^* + u_4^* \end{bmatrix} \quad (40)$$

Figure 8:
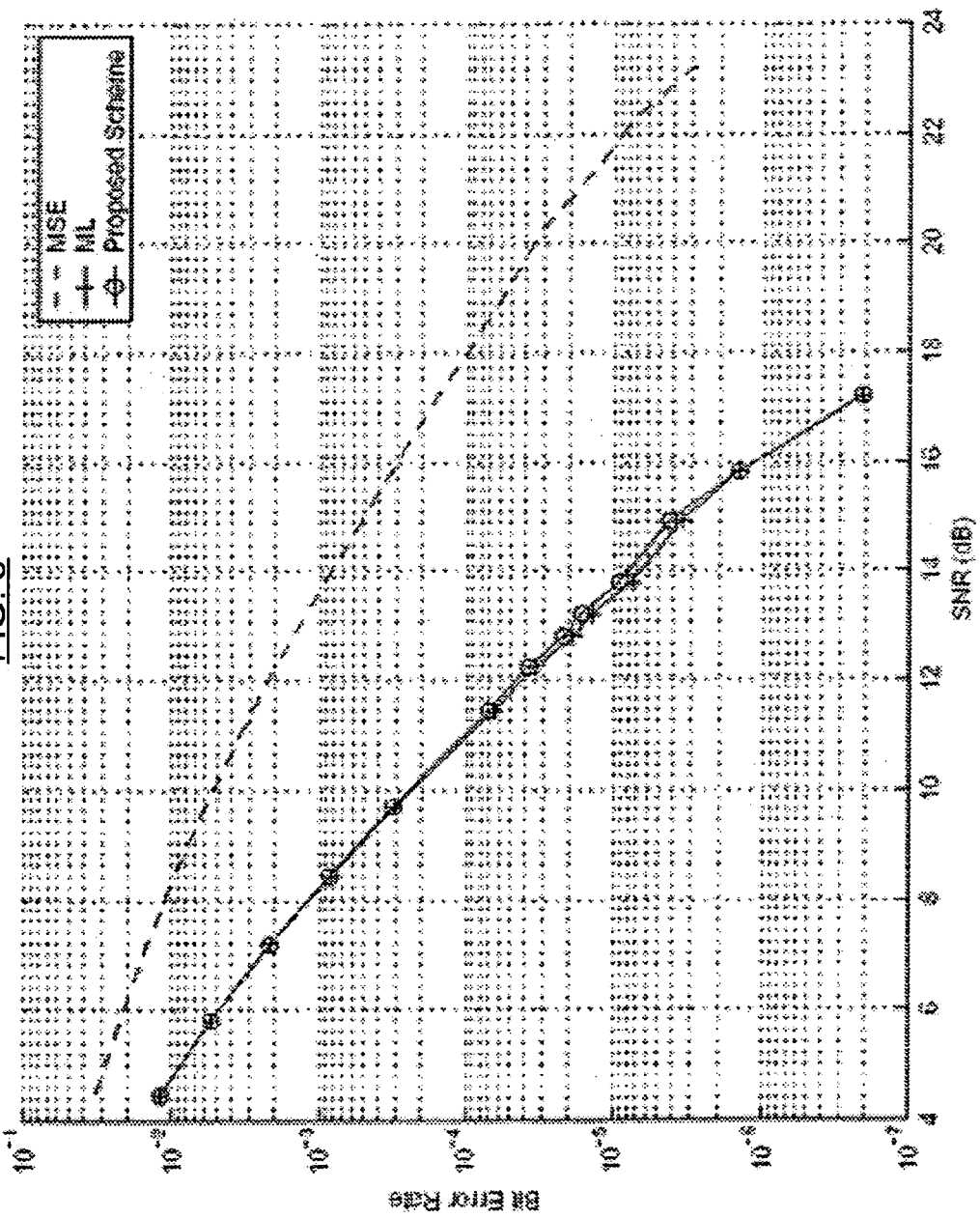
FIGS. 8 and 9 are BER v. SNR curves showing the performance of MSE, mimimum likelihood and multistage decoding according to at least one embodiment of the invention.
Figure 9:
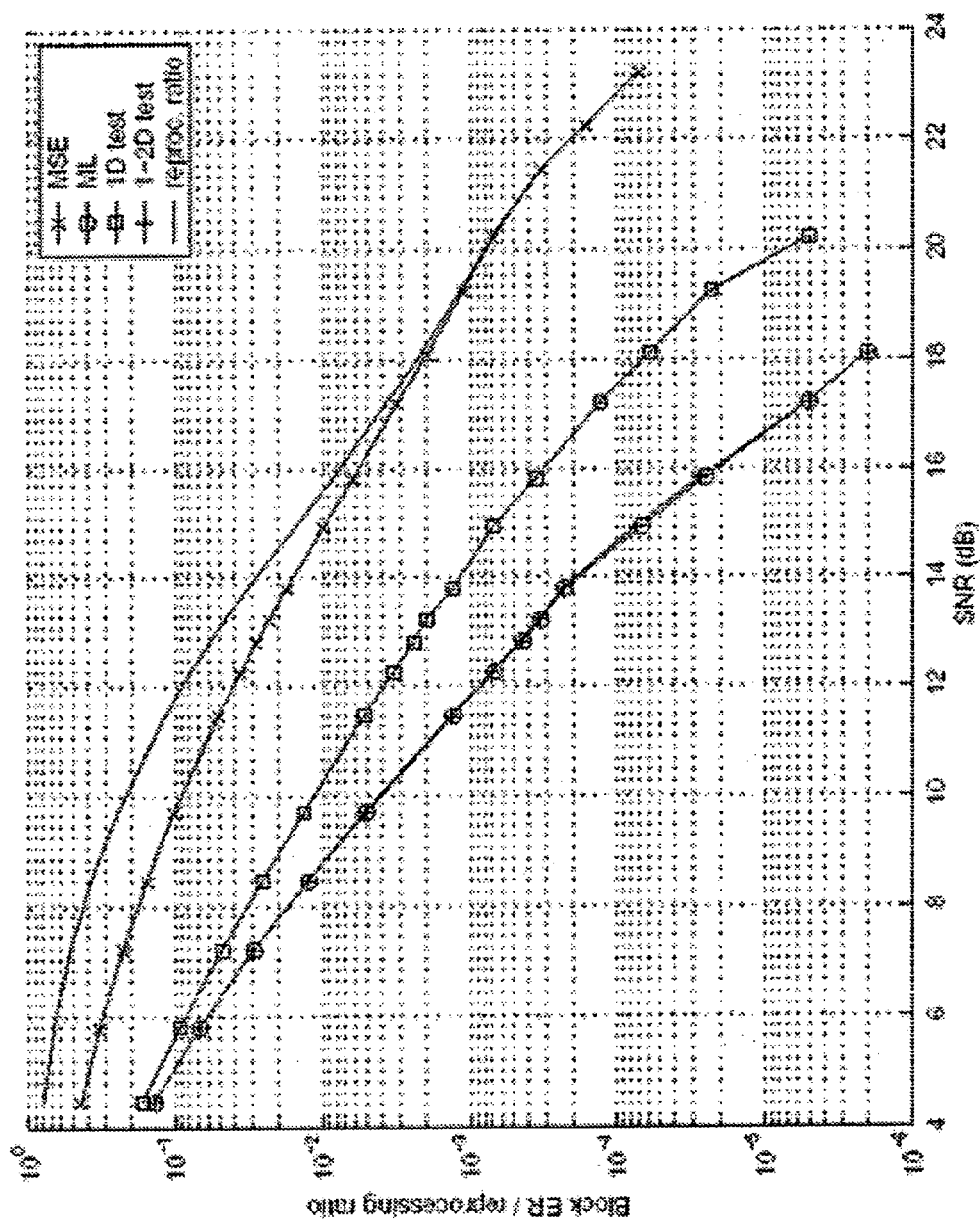

A general system was specifically chosen and specificity was avoided, such as, orthogonal space time code, unitary precoder, and so forth. In a test case, performance simulations were run on 100 complex, i.i.d. Gaussian channels with unitary variance. FIG. 8 presents the average bit error rate performance of the first and second order variation them as discussed above. There is almost no difference between the full-ML detection and the proposed scheme. FIG. 9 shows the block (or vector) error rate of the schemes, compared to MSE and full-ML. It shows that there is no difference between the block error rates of ML detection and the proposed scheme when considering first and second order variations, as was expected given the results in terms of bits. It can be seen that first order only test does not reach the ML performance, and a drift of several dB is observed. The SNR loss when considering only first order variation increases with the SNR. Also shown is the reprocessing ratio, which indicated the amount of data that are reprocessed by the sphere decoder, in the case of first and second order detection. For clarity, the reprocessing ratio of the 1-D test is not displayed. Ideally, the reprocessing ratio would be exactly the first scheme block error rate. This would indicate that no false alarm occurred.

A false alarm occurs when a symbol is reprocessed while the initial detection provided the ML estimate (or more generally, the same estimate that the second scheme will output). Because a one dimensional test is being used to perform a two-dimensional check, the ratio of false alarms may be relatively important. Ideally, in order to minimize the overall computational load, only the wrongly detected symbols are reprocessed. It was observed that the probability of false alarm can be reduced, specifically at high SNR, by determining which symbol vectors are close enough to their hard estimate that they cannot be wrongly detected. If we note $R_0$ the smallest possible distance between two adjacent lattice point, the estimate $S_0$ is guaranteed to be the ML estimate, in the case of white noise, if $$\|Y - HS_0\|^2 \le \frac{R_0^2}{4}.$$

This distance is defined in the transformed lattice space, and is obtained at some cost in terms of complexity. However, reusing vector A gives a close approximation $$\|Y - HS_0\|^2 \approx \frac{1}{\sigma_n^2} A(S_0 - \tilde{S})^T$$

with equality in the restrictive case of zero forcing equalization. The cost of this test is that of a vector-vector product (point product). $R_0$ is obtained in one run of the sphere decoder. This procedure does not impair the overall performance of the scheme (error rate), but reduces the ratio of reprocessed vectors. For low SNR, the probability of false alarm remains significant (about fifty percent). However, for high SNR, false alarm almost never occur. The ratio of reprocessed symbols, which drives the overall complexity of the system, shrinks relatively fast, and for typical error rate, the gain is of several order of magnitude. For example, for an uncoded target BER of $10^{-6}$, which correspond to a SNR of 16 dB, the sphere decoder is used on the average on less than one symbol every one hundred.

Figure 10:
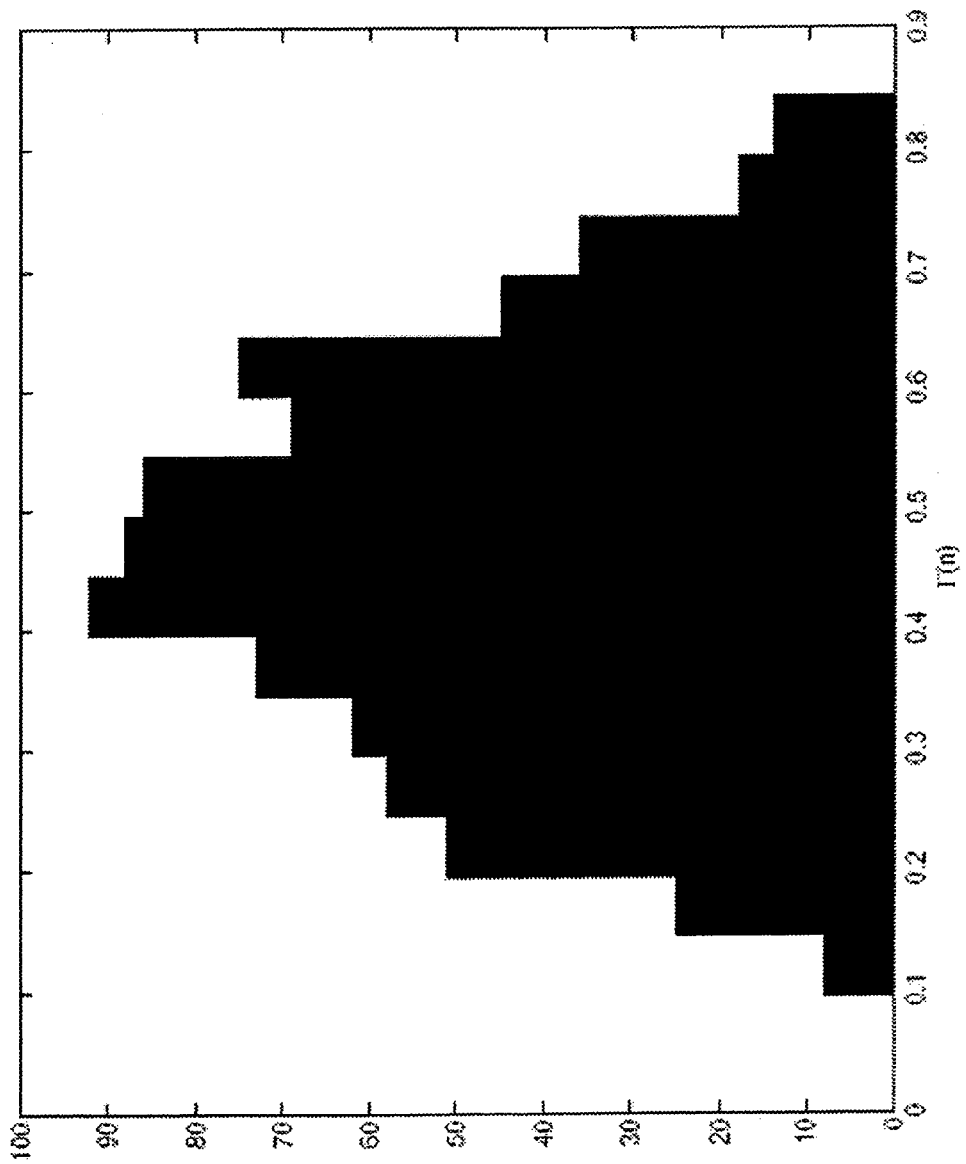
FIG. 10 is a distribution plot illustrating the distribution of the elements of vector Γ according to at least one embodiment of the invention.

The distribution of the elements of vector $\Gamma$ for this example is shown in FIG. 10. It can be seen that most of the [0; 1] range is covered. This distribution shows that it will not be possible to improve significantly the performance using margin coefficients that do not depend on the channel matrix. Hence, the computation of $\Gamma$ is very unlikely to be replaced by any predetermined values. In this example, modifying the test to include variations of orders superior to two will not be of interest, as the ML performance bound is already closely obtained. However, there is no proof so far that such good performance can be obtained for any channel and any space time code and precoder. Determining the misdetection rate (or a bound to it) appears to be a tedious task, but will be of great interest.

Figure 11:
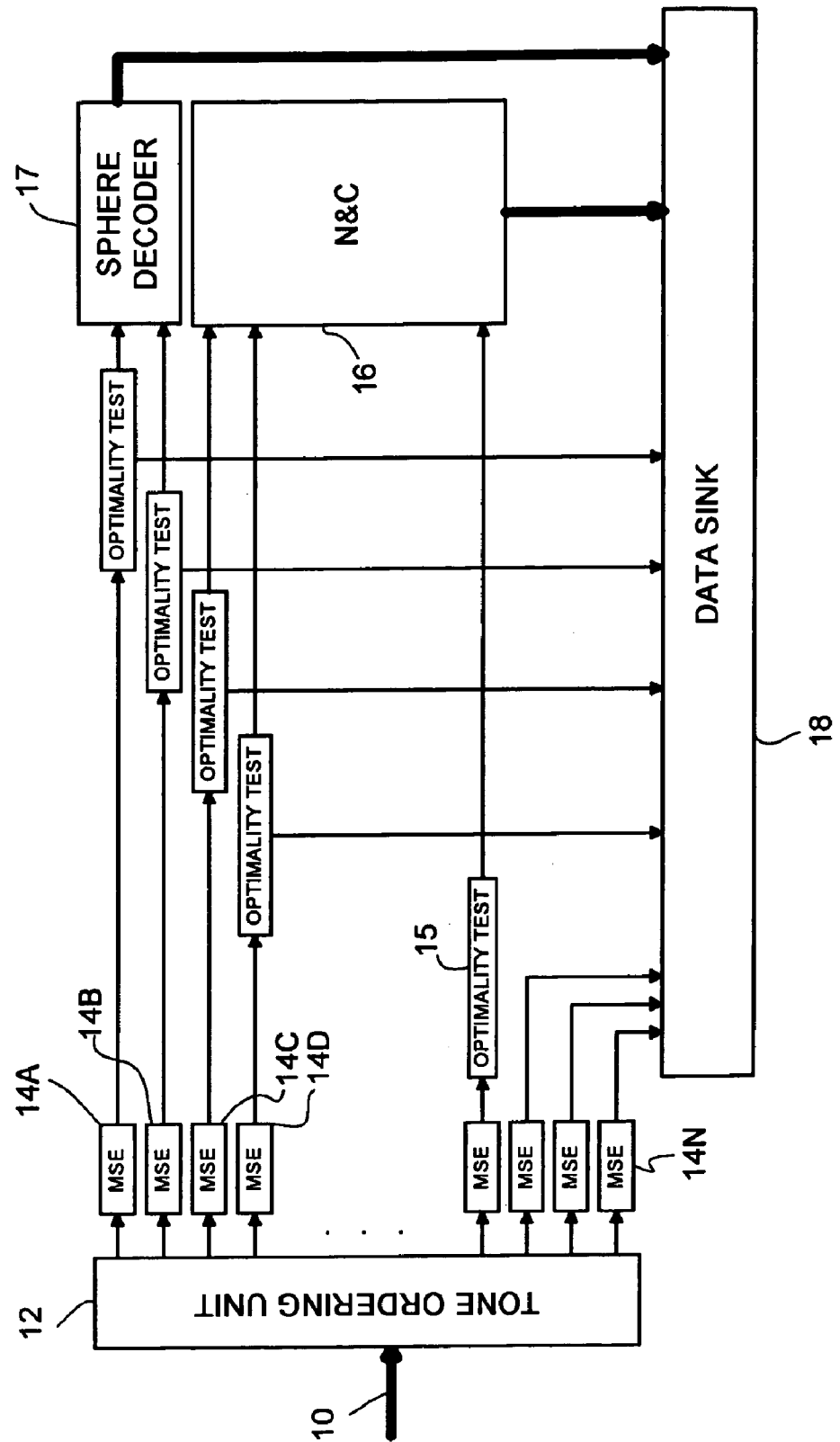
FIG. 11 is a block diagram illustrating a system for iterative symbol detection according to at least one embodiment of the invention.

Referring now to FIG. 11, a block diagram illustrating a system for iterative symbol detection according to at least one embodiment of the invention is provided. A tone based data signal 10 enters the tone ordering unit 12. Each tone is subjected to a symbol detection scheme 14A–N, such as, for example MSE as shown in the Figure. In various embodiments, those symbols that are detected correctly by the MSE-based scheme are output directly to a data sink 18. In various embodiments, some symbols may be subject to an optimality test 15 to determine if it is likely that the symbol has been correctly decoded. In various embodiments, if the results of the optimality test indicate that the symbol has been correctly decoded, the MSE detected symbol is output to the data sink 18. In various embodiments, if the results of the optimality test indicate that the symbol may not or has not been correctly decoded, the results are subject to a second stage of decoding. In various embodiments, and as shown in the Figure, two different second level processor may be utilized, such as the nulling and canceling detector 16 (such as Bell Labs layered space-time, or BLAST architecture) or the sphere decoder 17 with the worst tones going to the sphere decoder, the more complex of the two decoding schemes. In various other embodiments, only a single second level processor will be present. In still further embodiments, an optimality test will be performed on the output of one of the second level processors and may cause additional processing by the other second level processor, such as, for example, as shown in FIG. 7.

In typical MIMO-OFDM system, each separate tone faces an independent detection problem. However, the system discussed above in the context of FIG. 11, multistage MIMO symbol detection can be used at large scale where several tones can share the same reprocessing detector(s), thereby reducing the complexity because there is no need for one second stage per tone. Furthermore, in various embodiments, the optimality test discussed herein may be performed only on the tones that present a SNR below some threshold. In various embodiments, the SNR per tone is already known and therefore, only minimal additional processing is required to perform this threshold determination. In addition, in various embodiments, several first and second processing schemes can be implemented, while the tone ordering unit sends separate streams of data to these detectors according to their quality (SNR).

A low complexity optimality test for identifying badly detected data vectors in MIMO transmission was presented. Using this test as part of an adaptive, multi-stage detection system was shown to reduce significantly the overall complexity of the receiver, without compromising the performance. Nearly any detection scheme can be used with this test, and can benefit from the reduction of the number of calls to the complex algorithm. Finally, it should be appreciated that the same test can be used at each stage of a signal detection system involving more than two schemes, in which case successive stages process fewer and fewer symbols.

The embodiments of the present inventions are not to be limited in scope by the specific embodiments described herein. For example, although many of the embodiments disclosed herein have been described with reference to systems ad methods for multi-stage symbol detection in MIMO transmission, the principles herein are equally applicable to other aspects of signal detection. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breath and spirit of the embodiments of the present inventions as disclosed herein.

The invention claimed is:

1. A multistage system for signal detection comprising:
a first relatively low complexity detection unit configured to detect received symbols;
an optimality test unit configured to test the output of the first detection unit; and
a second relatively high complexity detection unit configured to reprocess those received symbols that fail a condition of the optimality test unit.

2. The system of claim 1, wherein the system is part of a multi-carrier transmission system having a plurality of different sub-channels each carrying bits of data.

3. The system of claim 1, wherein the received symbols are precoded QAM symbols.

4. The system of claim 1, wherein the first relatively low complexity detection unit is a minimum MSE detection unit.

5. The system of claim 1, wherein only symbols transmitted on tones presenting a SNR below a predetermined threshold are subjected to the optimality test.

6. The system of claim 1, further comprising a second detecting unit interposed between an output of the optimality test unit and an input of a second optimality test unit, adapted to perform reprocessing on symbol output by the first detecting unit.

7. The system of claim 1, wherein the optimality test unit determines whether a symbol has been detected correctly or if it needs further processing by the second detection unit or modification as determined by the optimality test.

8. The system of claim 7, wherein the optimality test unit determines that a symbol has been detected correctly if syndrome value is less than zero.

9. The system of claim 8, wherein the syndrome is defined as the vector Q, where $$Q = |A| - \Gamma \otimes \frac{d}{2} diag(R_H),$$

where $\otimes$ denotes the element-wise product.

10. A method of detecting signals comprising:
detecting a received signal containing at least one symbol with a first detector;
performing an optimality test on the output of the first detector; and
for those symbols passing the optimality test, outputting the symbols, otherwise, processing the symbols with a second detector.

11. The method of claim 10, wherein detecting with a first detector comprises detecting with a zero-forcing (ZF) detecting unit.

12. The method of claim 10, further comprising performing a nulling and canceling operation on symbols failing the optimality test prior to subjecting those symbols to the a second optimality test.

13. The method of claim 10, wherein the received signal is a symbol carried over a communication channel having a plurality of sub-carriers each carrying information.

14. The method of claim 13, wherein only symbols transmitted on sub-carriers presenting an SNR below a predetermined threshold are subjected to the optimality test.

15. The method of claim 10, wherein the received signal comprises precoded QAM symbols.

16. The method of claim 15, wherein detecting with a first detector comprises decoding with an MSE detecting unit.

17. The method of claim 10, wherein the optimality test unit determines that a symbol has passed the optimality test if a syndrome value is less than zero.

18. The method of claim 17, wherein the syndrome is defined as the vector Q, where $$Q = |A| - \Gamma \otimes \frac{d}{2} diag(R_H),$$

where $\otimes$ denotes the element-wise product.

19. An iterative method of detecting blindly precoded OFDM symbols comprising:
performing a first iteration of a B-G algorithm approximating a joint M-L detection on received; and
iteratively running the B-G algorithm updating the data with the results of the previous iteration using update equations (37), (38) and (39).

* * * * *